Figure 1:
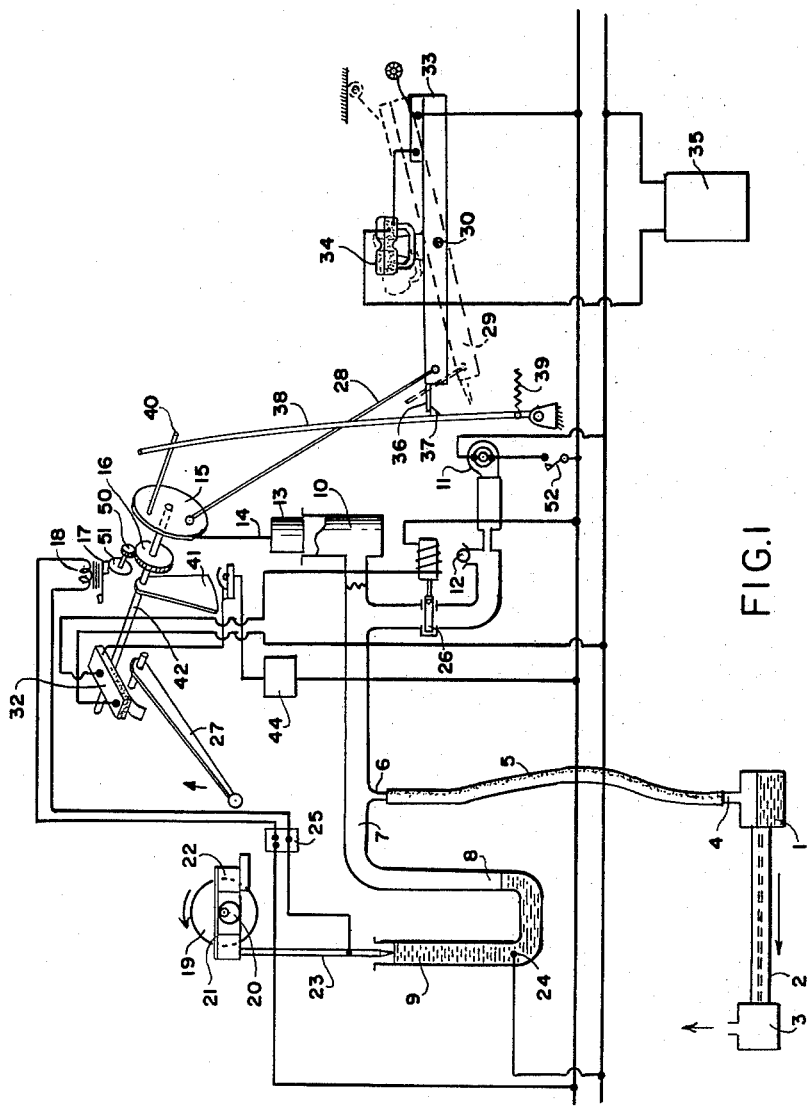

March 19, 1963  N. A. DE BRUYNE  3,081,621
IMPROVED APPARATUS FOR TESTING THE VISCOSITY OF A LIQUID
Filed May 10, 1960  3 Sheets-Sheet 1

*INVENTOR.*
NORMAN ADRIAN DE BRUYNE

ATTORNEYS.

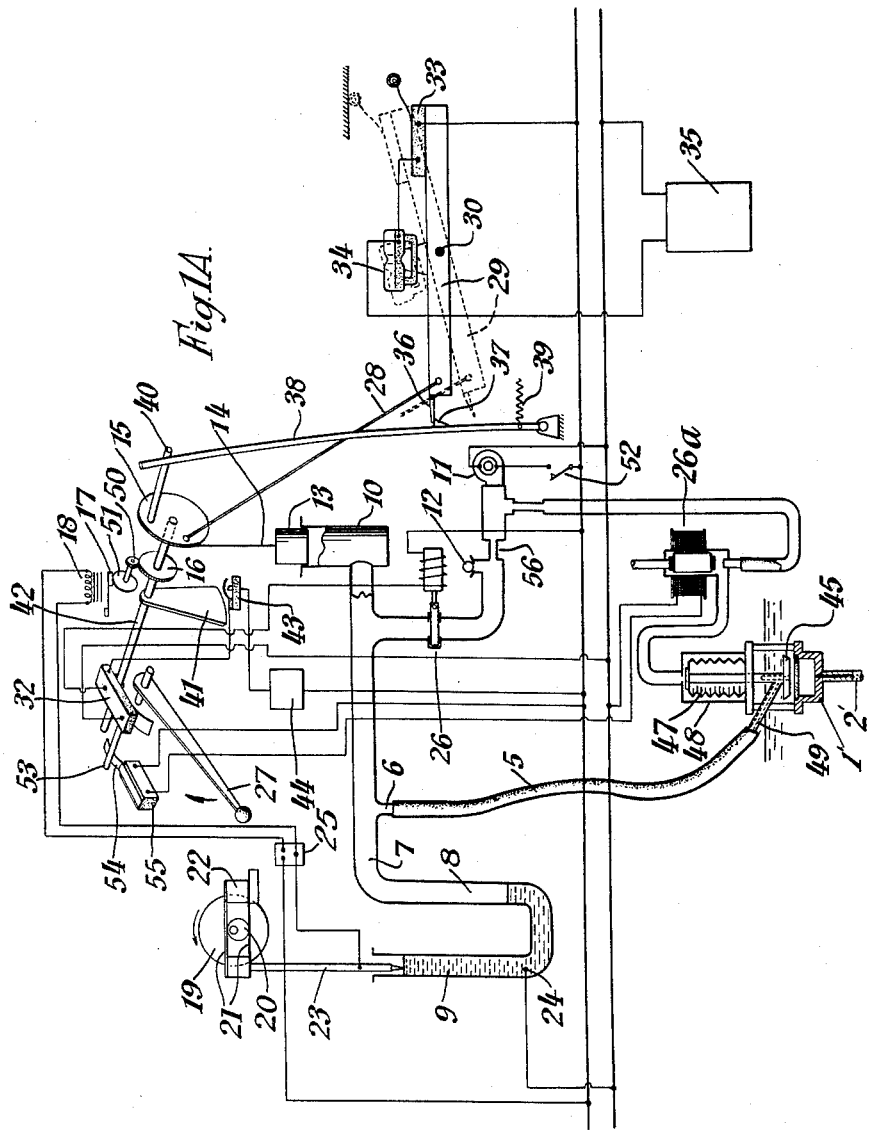

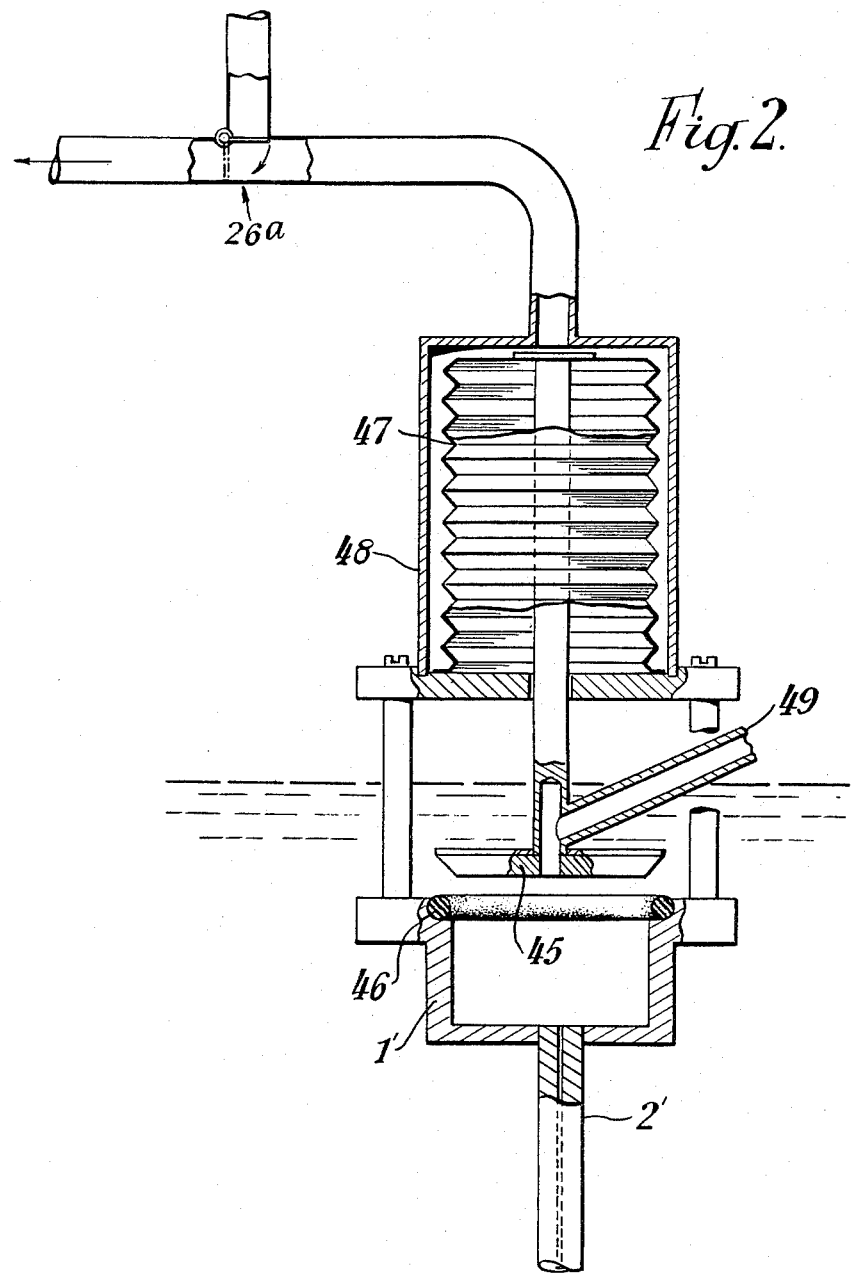

United States Patent Office 3,081,621
Patented Mar. 19, 1963

3,081,621
IMPROVED APPARATUS FOR TESTING THE VISCOSITY OF A LIQUID
Norman Adrian de Bruyne, Duxford, Cambridge, England, assignor to Techne (Cambridge) Limited, Duxford, Cambridge, England
Filed May 10, 1960, Ser. No. 28,057
Claims priority, application Great Britain May 11, 1959
10 Claims. (Cl. 73—55)

This invention relates to an improved apparatus for testing the viscosity of a liquid, the apparatus in its preferred form automatically measuring the viscosity and producing a printed record of the viscosity under various environmental conditions. The viscosity of a liquid is measured as the time taken for a given volume to pass through a capillary tube or restriction at a constant pressure. The volume, pressure and restriction are preferably chosen so that time taken for the given volume to flow through the restriction is numerically equal to the viscosity in poises.

The invention consists broadly in apparatus for measuring the viscosity of a liquid in which a gas is compressed by a piston or liquid column compelled to move in such a way that the gas remains at constant pressure while it forces the liquid through a capillary or restriction and the viscosity is measured by the time taken for the said piston or liquid column to move through a known distance or alternatively is measured by the displacement observed in a given time.

Referring to the accompanying drawings:
FIGURE 1 illustrates diagrammatically a preferred form of apparatus for carrying out the present invention;
FIG. 1A is a view similar to FIG. 1 showing a modified form of the invention; and
FIG. 2 is a detail sectional view on an enlarged scale of a portion of the modified form of the apparatus of FIG. 1A.

Referring in the first case to FIGURE 1, the sample of liquid the viscosity of which is to be measured is contained within a container 1 which is connected by means of a capillary tube 2 with a second container 3 open to atmosphere. Container 1 has a connection 4 at its upper end for the attachment of a flexible tube 5 attached at its upper end to a branch passage 6 leading from a tube 7 terminating at one end in a U shaped manometer 8 containing a mercury column 9, the opposite end of tube 7 leading to a vertically positioned cylinder 10.

Tube 7 is supplied with air by means of a priming pressure pump 11, the pressure of air being controlled by a safety valve 12.

Cylinder 10 contains a compensating piston 13 mounted for free sliding movement in cylinder 10, piston 13 being carried by a flexible tape 14 passing around and attached at its upper end to a pulley 15.

Pulley 15 is mounted on a shaft 42 carrying a gear wheel 16 meshing with a pinion 50 driving a brake disc 51 engageable by a brake 17, brake 17 normally preventing disc 51 and pulley 15 from rotating but being released when the high speed relay 18 is de-energised.

Periodical de-energisation of relay 18 with consequent release of the brake and pulley 15 to allow piston 13 to descend is under the control of an electric motor 19 driving an eccentric 20 revolving between a pair of parallel blade springs 21 anchored at 22 and carrying a moving contact 23 which makes intermittent contact with the mercury column 9.

A fixed contact 24 is in permanent contact with the mercury column and is connected with one of the supply leads of the main line, the other supply lead of the main line being connected via a transistor amplifier 25 to the high speed relay 18 and thence via the transistor amplifier to the moving contact 23.

Oscillatory movement of the contact 23 is quite small and is in the region of one millimetre, the oscillatory movement giving a smaller response and a measure of proportional control, the pressure variation of the system being much less than ½% and therefore being regarded as delivering constant pressure.

The system is primed with air to the required pressure by means of the pump 11 and when the required pressure has been reached the solenoid operated valve 26 is closed. The sample liquid will then be forced through the capillary tube by the pressure of air in the system and as the air pressure falls, the height of the mercury column 9 will be lowered causing the column to break contact with the moving contact 23. The relay 18 will thus be de-energised, releasing the brake 17 and allowing the pulley 15 to rotate. The piston 13 then descends to replace the lost volume and restore the pressure in the system. When working pressure is restored the mercury again makes contact thus closing the electrical circuit, applying the brake and preventing further downward movement of the piston. This cycle is repeated until the predetermined volume change has taken place.

Operation of the apparatus is instigated by upward movement of a hand lever 27 which as a result of its upward pivotal movement closes micro-switch 32 to complete the electrical circuit through solenoid operated valve 26 to close the valve and segregate the pump from tube 7. Micro-switch 32 is carried by shaft 42 and consequently upward movement of lever 27 rotates shaft 42 and pulley 15 to lift piston 13 to its uppermost position. At the same time platform 29 is moved about its pivotal point 30 to the horizontal position shown by full lines and by means of link 28 causing its extremity 36 to engage a detent 37 on locking lever 38, interengagement of parts 36 and 37 being maintained by spring 39.

Platform 29 carries a micro-switch 33 and also a mercury time delay switch 34 which closes when the platform assumes a horizontal position, in which position micro-switch 33 is open, switches 33 and 34 being arranged in series and controlling the operation of a printer 35 to produce a permanent record of the test. The drawings show the parts in the position they assume as a result of lifting lever 27.

Disengagement of parts 36 and 37 is brought about by initial downward movement of piston 13, pulley 15 carrying an arm 40 which engages lever 38 to move the latter in an anti-clockwise direction to release the platform.

Shaft 42 carries a quadrant 41 which as a result of initial downward movement of the piston 13 closes micro-switch 43 completing an electrical circuit through a timing counter 44 which may conveniently form a part of the printer 35. The printer including the timing counter may be of any suitable known construction and forms no part of the present invention.

FIGURE 1A shows also an alternative form of container for the sample fluid which is illustrated on an enlarged scale in FIGURE 2. This container has the advantage that it can be dipped into a large vessel containing the liquid to be tested and a sample taken.

Like numbers refer to like parts in the drawing and throughout the specification. In FIG. 1A the container for the sample liquid is indicated by reference numeral 1'. The container 1' is mounted below the level of liquid in the larger vessel, the two containers being separable by a closure valve 45 which can make sealing engagement with an O type sealing ring 46.

Air pressure derived from the pump 11 is applied to the exterior of bellows 47 in housing 48 under the control of the solenoid operated valve 26a.

Valve 45 is carried by the upper end of the bellows and consequently pressure of air on the bellows will move the valve onto its seating to segregate container 1' from the larger vessel. Air pressure is applied to the surface of the liquid in container 1' through a branch connection 49 and through the centre of valve 45 by flexible pipe 5 and branch connection 49.

When the pump 11 is brought into operation and lever 27 is raised, bellows 47 will be compressed to close the valve 45 thereby imprisoning a sample of the liquid in the container 1. The pump is brought into operation by closing the switch 52 and continues to operate throughout the test, air being released by valve 12 when the system has been primed and valve 26 being closed to segregate the pump from tube 7. Pump 11 is driven by electric motor 19, the parts being shown separately for clarity of illustration.

To make a test of a sample liquid, switch 52 to the main line is first closed.

Lever 27 is then raised closing micro-switch 32 which opens valve 26, and micro-switch 55 is also closed so that the three way valve 26a allows compressed air to be applied to the bellows 47 to close valve 45. The pump now raises pressure in the system. Upward movement of lever 27 raises the piston 13 and moves platform 29 into a horizontal position causing parts 36 and 37 to interengage to hold the platform in that position.

Lever 27 is then released opening micro-switch 32 to close valve 26 sealing off priming pump unit.

Initial priming pressure starts the flow of liquid through the capillary tube and causes the mercury column to contact moving contact 23 which has a constant upward and downward vibratory movement.

As the pressure in the system drops due to displacement of the liquid, the column of mercury will break contact with contact 23, thus releasing the brake 17 and allowing piston 13 to descend so as to restore the pressure to compensate for loss of volume. At the same time quadrant 41 will rotate to close micro-switch 43 and start counter 44 to record time for required volume change.

The piston will therefore move downwardly periodically the brake being re-applied each time the electrical connection is re-made between the mercury column and contact 23.

As the quadrant moves past the micro-switch 43, the switch opens, stopping the counter and completing the test.

At the same time arm 40 engages lever 38 to disengage parts 36 and 37, allowing platform 29 to drop and actuate micro-switch 33 and provide an electrical pulse to actuate the printer 35. The delay switch 34 then breaks and the printer is automatically brought out of circuit.

Simultaneously the arm 53 attached to micro-switch 32 will strike the arm 54 on micro-switch 55 causing the three way valve 26a to disconnect the air pressure from the bellows chamber 48 and connect the bellows chamber 48 to the atmosphere, thus causing valve 45 to lift and allow a fresh supply of liquid to enter container 1'.

It will be appreciated that restriction 56 is provided for the purpose of ensuring a sufficient air pressure on the bellows to maintain valve 45 closed during the test.

I claim:

1. Apparatus for measuring the viscosity of a liquid comprising
    a container for the liquid, the viscosity of which is to be measured,
    flow resistant means connected to said container and adapted to discharge said liquid therefrom at a rate dependent on the viscosity of the liquid and the pressure applied to said liquid,
    a pressure system for applying a predetermined superatmospheric gaseous pressure to the surface of the liquid in said container to force said liquid through said flow resistant means,
    means for maintaining said gaseous pressure constant until a predetermined quantity of liquid has passed through said flow resistant means,
    and means operable by said pressure maintaining means for measuring the time required for said predetermined quantity of liquid to pass through the flow resistant means.

2. The apparatus as claimed in claim 1 in which said flow resistant means is a capillary tubing.

3. Apparatus for measuring the viscosity of a liquid comprising
    a container for the liquid, the viscosity of which is to be measured,
    flow resistant means connected to said container and adapted to discharge said liquid therefrom at a rate dependent on the viscosity of the liquid and the pressure applied to said liquid,
    a pressure system for applying a predetermined superatmospheric gaseous pressure to the surface of the liquid in said container to force said liquid through said flow resistant means,
    adjustable air pressure means acting upon the gas in said pressure system,
    means for automatically adjusting the adjustable air pressure means to maintain said gas at constant pressure as said liquid is displaced from said container,
    timing means for determining the time required for a predetermined quantity of the liquid to pass through said flow resistant means,
    means connected to the means for adjusting the air pressure to start and stop said timing means,
    and means for recording the time measured by said timing means for said predetermined quantity of liquid to pass through said flow resistant means.

4. Apparatus for measuring the viscosity of a liquid comprising
    a container for the liquid, the viscosity of which is to be measured,
    flow resistant means connected to said container and adapted to discharge said liquid therefrom at a rate dependent on the viscosity of the liquid and the pressure applied to said liquid,
    a pressure system for applying a predetermined superatmospheric gaseous pressure to the surface of the liquid in said container to force said liquid through said flow resistant means,
    adjustable air pressure means acting upon the gas in said pressure system,
    pressure transducer means in said pressure system responsive to the pressure of said system to control the adjustable air pressure means as said liquid is displaced from said container,
    timing means for determining the time required for a predetermined quantity of the liquid to pass through said flow resistant means,
    means connected to the means for adjusting the air pressure to start and stop said timing means,
    and means for recording the time measured by said timing means for said predetermined quantity of liquid to pass through said flow resistant means.

5. Apparatus as claimed in claim 4 wherein said pressure transducer means comprises a manometer including a mercury column operated by the gaseous pressure in the system,
    said pressure transducer means also comprising an electrical circuit which includes a portion of said mercury column and an electrical contact element adjacent one surface of the mercury column as automatic switching means.

6. Apparatus as claimed in claim 5, comprising means for imparting a small reciprocatory movement to said electrical contact element to make and break contact with the mercury column,
brake means for controlling the movement of said adjustable pressure means,
said electrical circuit comprising means to control said brake means as contact is made and broken by said mercury column and reciprocating contact whereby said brake means is periodically released.

7. Apparatus as claimed in claim 3 wherein said pressure system comprises as the adjustable air pressure means, a cylinder connected to the system and a piston movable in said cylinder,
said means for automatically adjusting the air pressure means comprising an element for moving said piston, and
control means for said timing means connected to the means for moving said piston.

8. Apparatus as claimed in claim 7 wherein the control means for the timing element comprises a microswitch.

9. Apparatus as claimed in claim 1, comprising a container which is adapted to be immersed in a bath of the liquid to be tested, said container being normally open to the liquid of said bath,
means for sealing off a portion of the container adapted to receive liquid when immersed in said bath as a viscosity test is about to be run.

10. Apparatus as claimed in claim 9 comprising a pressure increasing system to build up pressure in the pressure system before a test is begun, and bellows means operatively connecting said pressure increasing system to the means for sealing off the portion of the container.

References Cited in the file of this patent
UNITED STATES PATENTS

| | | |
|---|---|---|
| 2,066,249 | Buttari | Dec. 29, 1936 |
| 2,322,814 | Binckley | June 29, 1943 |
| 2,503,660 | Exline et al. | Apr. 11, 1950 |
| 2,712,752 | Hage | July 12, 1955 |